United States Patent
Vlahos et al.

(10) Patent No.: US 6,363,526 B1
(45) Date of Patent: *Mar. 26, 2002

(54) EDGE ENHANCEMENT CORRECTION FOR IMPROVED IMAGE QUALITY

(75) Inventors: Paul Vlahos, Tarzana; Arie Berman, Chatsworth; Arpag Dadourian, Northridge, all of CA (US)

(73) Assignee: Ultimatte Corporation, Chatsworth, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,955

(22) Filed: Apr. 3, 1998

(51) Int. Cl.⁷ .................. G06K 9/36; H04N 5/208; H04N 9/68
(52) U.S. Cl. ............ 725/37; 348/606; 348/627; 348/630; 348/661; 382/163; 382/266; 382/270
(58) Field of Search ............... 348/606–631, 348/643–661; 382/163–164, 260–266; 725/37

(56) References Cited

U.S. PATENT DOCUMENTS

| | | | | | |
|---|---|---|---|---|---|
| 4,350,995 A | * | 9/1982 | Harlan | .......... | 358/37 |
| 5,050,223 A | * | 9/1991 | Sumi | .......... | 348/625 |
| 5,392,137 A | * | 2/1995 | Okubo | .......... | 358/462 |
| 5,691,779 A | * | 11/1997 | Yamashita et al. | .......... | 348/645 |
| 5,825,937 A | * | 10/1998 | Ohuchi et al. | .......... | 382/261 |
| 5,847,774 A | * | 12/1998 | Cho | .......... | 348/625 |
| 5,898,464 A | * | 4/1999 | Cho | .......... | 348/625 |
| 5,946,416 A | * | 8/1999 | Akagi et al. | .......... | 382/194 |

* cited by examiner

Primary Examiner—Andrew Faile
Assistant Examiner—Reuben M. Brown
(74) Attorney, Agent, or Firm—Blakely Sokoloff Taylor & Zafman

(57) ABSTRACT

An objectionable outlining effect, seen as dark edges and white edges outlining everything in a scene, is eliminated by clipping or limiting the spikes generated by excessive enhancement. Specifically, a method is used for improving the quality of an enhanced video image, while simultaneously maintaining or improving image sharpness, by clipping the RGB levels of the enhanced video image, at the points of enhancement, to upper and lower level bounds representing the signal levels of the video signal prior to its enhancement.

3 Claims, 4 Drawing Sheets

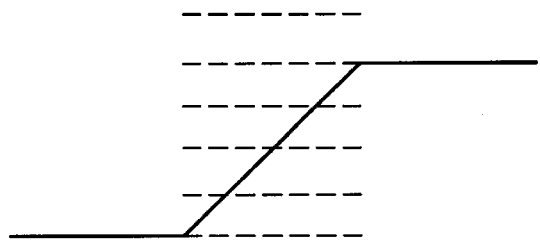
FIG. 1
VIDEO NOT ENHANCED
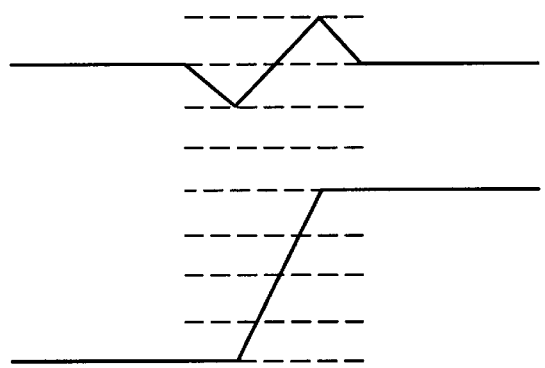
FIG. 2
NORMAL ENHANCEMENT SIGNAL
FIG. 3
NORMAL ENHANCED VIDEO SIGNAL
(Fig. 1 + Fig. 2)
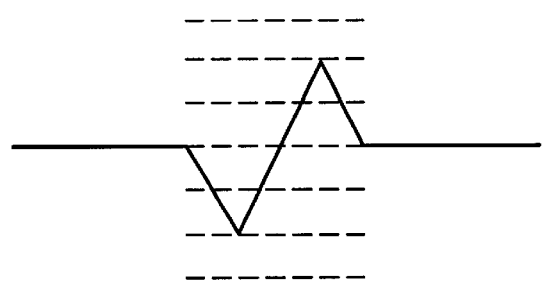
FIG. 4
EXCESSIVE ENHANCEMENT SIGNAL
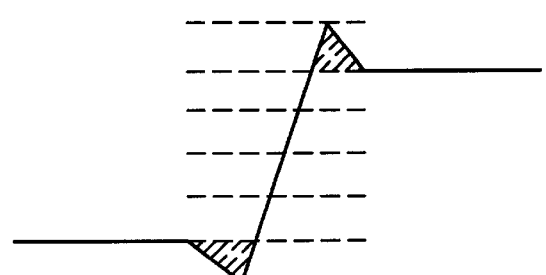
FIG. 5
EXCESSIVELY ENHANCED VIDEO SIGNAL
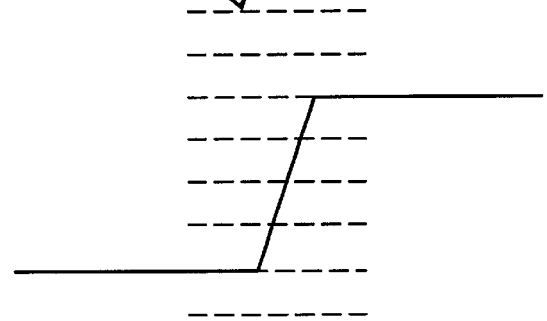
FIG. 6
CLIPPED ENHANCED SIGNAL
(SIMILAR TO Fig. 3)

TOP LEVEL FLOW CHART FOR EDGE ENHANCEMENT CORRECTION

FLOW CHART FOR "MULTIPLE ZERO CROSSING CHECK"

FLOW CHART FOR "DISTANCE FROM ZERO-MATTE BOUNDARY CHECK"

EDGE ENHANCEMENT CORRECTION FOR IMPROVED IMAGE QUALITY

BACKGROUND OF THE INVENTION

The detail in a color image represented by a video signal is visible because a relatively abrupt change of signal level occurs in one or more of its color components. This change of level is identified as an edge. A detail signal is generated whose level is a function of the rate of signal level change of the color components representing this edge. This detail (image enhancement) signal, when applied to the video signal from which it was generated, increases the abruptness or steepness of detail edges which enhances the visual sharpness of the video image. Image enhancement is generally applied to all areas of the image and is appropriate since it is a function of detail within the image. The enhancement process is described in numerous patents including U.S. Pat. Nos. 5,103,299 4,855,829, 5,696,852, and 4,994,915.

The detail signal in video cameras and scanners is adjustable. The greater the amplitude of the detail signal, the sharper the image. However, as the level of the detail signal is increased, a level is reached above which positive and negative spikes are generated that outline elements within the image and give the image a hard edged look. The detail level adjustment is a compromise between increased image sharpness, and image degradation from overly hard edges.

In image compositing, the subject is photographed against a colored backing, which is later replaced in the compositing process by the intended background. The bright color of the backing (typically blue or green) at the edge of the subject, often induces a large and inappropriate edge enhancement since the background to be inserted is not likely to be the bright color of the backing. This inappropriate image enhancement at the subjects edge causes a visible and objectionable hard edge outlining the subject in the composite image.

SUMMARY OF INVENTION

An objectionable outlining effect, seen as dark edges and white edges outlining everything in a scene, is eliminated by clipping or limiting the spikes generated by excessive enhancement. At any abrupt change of signal level, a step exists from a given level to a higher or lower level for one or more of the component colors. These two signal levels at the step establish lower level and upper level bounds. The spikes resulting from excessive enhancement extend below the lower level bound and above the upper level bound. It is the extension of the spikes below and above the unenhanced video signal that is clipped. These clips prevent the enhanced video signal from exceeding the upper level, or from going lower than the lower level. By clipping the enhancement spikes from the video signal, the objectionable outline and hard edges are eliminated while improving image quality and sharpness.

BRIEF DESCRIPTION OF THE DRAWINGS

FIG. 1 illustrates a change in video signal level of one of the image colors Red, Green, or Blue.

FIG. 2 illustrates the enhancement signal generated from the signal of FIG. 1.

FIG. 3 shows an enhanced (steeper) transition within the subject obtained by adding the enhancement signal of FIG. 2 to the video signal of FIG. 1.

FIG. 4 shows an excessive enhancement signal generated by excessive gain or by a large signal change that can occur at the transition from a subjects edge to a colored backing.

FIG. 5 illustrates the positive and negative spike (shaded areas) generated in the enhanced video signal due to an excessive enhancement signal.

FIG. 6 illustrates the enhanced video signal after the spikes are clipped.

DETAILED DESCRIPTION OF THE INVENTION

Figure 7:
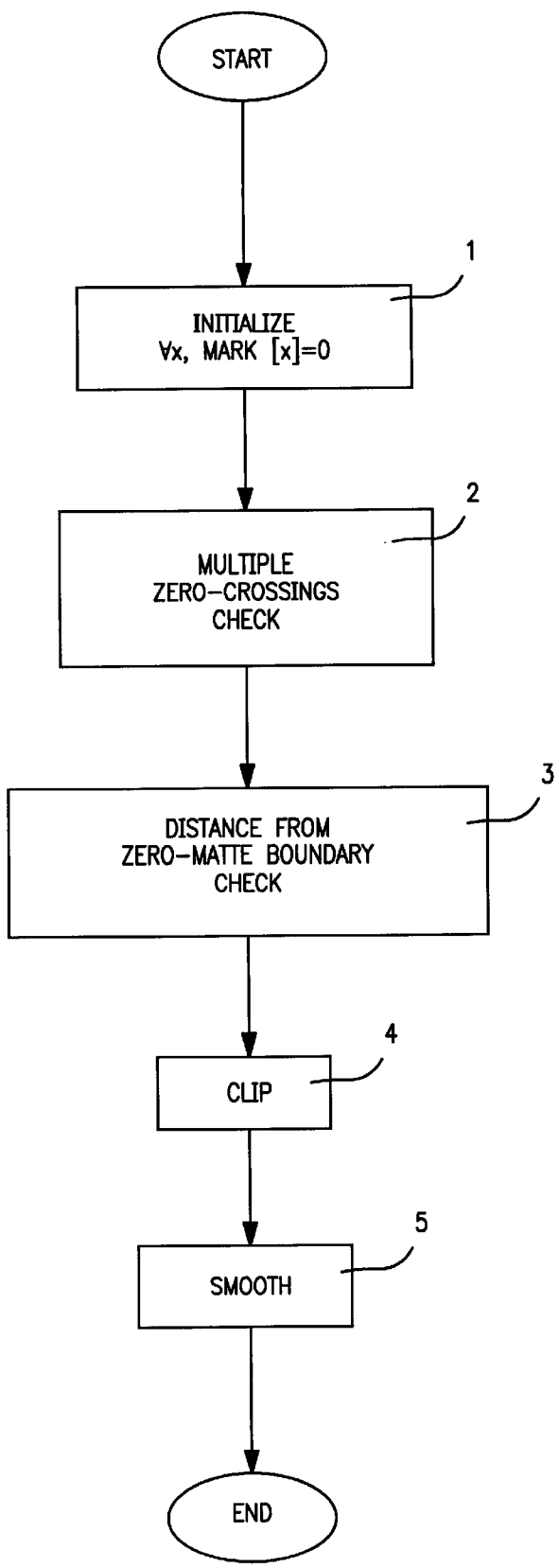
FIG. 7 shows an overview of the edge enhancement correction process.

FIG. 1 illustrates a moderately abrupt change in signal level occurring within the subject. The resulting enhancement signal of FIG. 2 when applied, at the proper level, to the video signal of FIG. 1, results in the enhanced (steeper edged) signal of FIG. 3. In an attempt to obtain maximum subjective image sharpness, the detail signal may be raised to a higher level as shown in FIG. 4. This excessively large detail signal, when applied to the video signal, generates the shaded spikes of FIG. 5. The adjustment of the enhancement signal level is therefore a compromise between a sharper image and an image not excessively degraded by hard edges.

The red (or green, or blue) signal level at a given pixel position is forced to lie between a lower bound and an upper bound, by "clipping" (lowering) the level to the upper bound if it is higher than that bound, or "clipping" (raising) the level to the lower bound if it is lower than that bound, as shown in FIG. 5, but otherwise, if the level lies between these two bounds it is left alone. The clipped signal of FIG. 6 is identical to the signal of FIG. 1, except for its steeper edge.

An additional increase in horizontal resolution may be achieved (steeper signal rise and fall) by first increasing the detail signal amplitude to an objectionable hard edged level, then removing the hard edge by clipping as described. An alternative procedure for increasing horizontal resolution is simply to treat the signal of FIG. 6 as an original signal, generate a detail signal, apply said detail signal, and clip if necessary.

The lower and upper clipping bounds are the RGB levels found at two different pixels, one lying at one or more pixels to one side of the given pixel, and the other lying at one or more pixels to the other side. E.g. one is to the left, and the other to the right, or one is above and the other is below the given pixel. Specifically, for clipping pixels in a horizontal line, the level at position x is clipped to be between the level at pixel position x−s and the level at pixel position x+s, for some small selected preset value of s, (e.g. 1, 2, 3, etc. pixels). The "clipping" is applied separately and independently to each of the three color component channels; red, green and blue.

When processing a line or sequence of pixels, starting at a designated pixel x, the pixel at position x−s will already have been processed (clipped). It is therefore necessary to retain the original level at x−s, (as well as the processed level) because the original level at x−s, not the processed level, is used when clipping the signal level at position x. The clipping function, as described, may be applied to the entire image or restricted to the subject's edge.

One of the hallmarks of film is its high definition without the hard edges so typical of television images. To preserve this film look, film scanners add very little enhancement to the scanned image. If the subject is against a colored backing, however, the bright backing will generate a hard edge with overshooting spikes as in FIG. 5, even though the detail signal for the rest of the image is not excessive. Therefore, clipping should be limited to the transition area between the subject and the backing.

The lower resolution of a television image requires significant enhancement to provide an optimally sharp image. The enhanced video will therefore contain small spikes at the edges of visible detail within the image. These small spikes become a necessary part of the image enhancement for best subjective image sharpness, and do not want to be clipped.

Restricting clipping to the subject's edge leaves the enhancement within the subject unaffected. However, restricting the clipping to the subjects edge requires knowledge as to the location of that edge. The subject edge is determined using the matte function Ec, which is zero in the opaque subject area, and larger than zero in the backing area. Two pixels are examined, one at position x−el, and the other at position x+el. The subject edge is found when only one of these two positions has a matte level of zero. This test may be defined as "condition 1" (which is based on the distance from the zero-matte boundary). If that condition is not met, then pixel x is not within el pixels of the subject edge, and clipping does not occur.

A second condition, "condition 2", determines whether pixel x is near a "reasonably simple" subject edge, or a complex subject edge such as multiple strands of hair. When a matte signal Ec is available, this can be done by counting the number of times the matte signal Ec changes from zero to non-zero (a "zero-crossing"), i.e. counting the number of subject edges, as x moves along a line of pixels within some small adjustable window whose size is, 2gap+1, where "gap" is a user adjustable parameter. When a matte signal is not available, any means of detecting changes, such as a derivative signal, can be examined for multiple changes in the neighborhood of each pixel position x.

If the count of zero-crossings or multiple changes indicates a single edge, then the subject is simple and "condition 2" is said to be met. Otherwise, the subject is not "simple" and clipping is not performed, since clipping in such a region can create undesirable artifacts. Therefore, clipping is permitted only in the neighborhood of a simple subject edge, defined as meeting both condition 1 and condition 2.

Clipping the video signal at the subject's edge may be performed either before or after the subject is composited with a selected background scene.

After clipping the enhanced subject edge, (or the entire image), the clipped pixels may be smoothed by taking a weighted average of the current pixel and its two adjacent neighbors, one to the left and one to the right for horizontal smoothing, or one above and one below for vertical smoothing. Typically, the current pixel is given a weight of C=0.5, while the adjacent pixel on either side is given a weight of A=0.25, the three weights A+C+A summing to 1.0.

The edge of the subject was defined as that point at which the matte signal, Ec, is no longer zero. The matte signal, Ec, also called the alpha channel signal, or key signal, is determined by any equation that provides a zero in the subject area, and a signal larger than zero in the backing area. The following patents describe the development of the Ultimatte matte signal, which is generically in the form of:

$$Ec=B-\max(G,R)$$

These patents are U.S. Pat. Nos. 4,100,569; 4,344,085; 4,625,231 and 5,343,252.

When a matte signal Ec of the type described above is not available, a derivative signal can be used, taking high derivative levels as indicating "subject" or more specifically "subject edge" regions. The "negative" of that signal, i.e. max{h−|derivative|, 0}, where h is the lowest derivative level which we consider as definitely indicating a subject edge, can then be used effectively as though it were a matte signal, at least for our edge enhancement correction purposes here. In this way, the rest of our discussion, making references to Ec, still applies.

When signal clipping is restricted to the subjects edge, a preferred clipping process includes the following steps:

1. The clipping process is applied to all pixels on each horizontal scan line for which both said condition 1 and condition 2 are satisfied, using (for example), s=1, el=2, and gap=3.
2. To the above result, clipping is again applied on each horizontal scan line for each pixel meeting condition 1 (ignoring condition 2), using s=1 and el=3. This second pass serves to "clean" some of the effects of the first pass, and to clip any pixels missed in the first pass.
3. The above video signal having been horizontally clipped as in step 1 and 2 above, is vertically clipped using the levels at pixel position x in the previous raster line (L−1) and at pixel position x in the following raster line (L+1), as the upper and lower bounds for the current pixel x on the scan line lying between them, but only when only one of these two bound level pixels has a matte level of zero.

When processing an interlaced field rather than a consecutively scanned frame, the pixel at position x from the previous line (L−2) lies two pixels above the current pixel, and the pixel on the following line (L+2) is two pixels below the current pixel.

The smoothing described in steps 4 and 5 below are optional. They are applied when needed to clean up color fringing, and other edge artifacts. Weighting factors A and C need not be exactly 0.25 and 0.50, but these numbers have provided good results.

4. The above video signals, having been horizontally clipped and vertically clipped, are then horizontally smoothed by applying the smoothing algorithm to all and only those pixels subjected to clipping using weighting factors of A=0.25 and C=0.50.
5. To the horizontally smoothed video signal of step 4 above, vertical smoothing is applied to all and only those pixels subjected to clipping either horizontally or vertically, using weighting factors of A=0.25 and C=0.50.

If the entire enhanced image is to be clipped, the process becomes much simpler since there is no need to locate the subjects edge. Such an occasion arises when in a scanned film, the enhanced signal level, at the points of enhancement, does not exceed the unenhanced signal, as shown in FIG. 3. The spikes of FIG. 5 will still arise at the subjects edge because of the very high contrast between the brightly colored backing and the subject. Clipping the entire image will clip only those spikes extending above and below the level of the unenhanced signal.

A second occasion arises in a television video signal when the enhanced image includes small spikes overshooting the bounds defined by the unenhanced image, and where said small spikes provide optimal subjective image sharpness. However the large spikes of FIG. 5 will still be generated at the edge of the subject because of the very high contrast between the brightly colored backing and the subject. A small selected offset, equal to the height of the small spike overshoot, permits clipping the large spikes at the subjects edge without clipping the smaller spikes introduced by enhancement. A negative offset is added to the lower bound and a positive offset is added to the higher bound. These offsets need not be equal.

A preferred method for clipping and smoothing the entire image is as follows:
1. On each horizontal scan line, RGB levels at pixel positions x−s, and x+s form an upper and lower bounds for the RGB levels at pixel position x, so that the RGB levels at pixel position x are each raised to the lower bound if below it, or lowered to the upper bound if above it.
2. The above video signal, having been horizontally clipped, is vertically clipped using the RGB levels at pixel position x in the previous raster line and at pixel position x in the following raster line, as the upper and lower bounds for the current pixel on the scan line lying between them.

When processing an interlaced field rather than a consecutively scanned frame, the pixel at position x from the previous line lies two pixels above the current pixel, and the pixel on the following line is two pixels below the current pixel.
3. The above video signal having been horizontally clipped and vertically clipped is then horizontally smoothed by applying the smoothing algorithm to all pixels which were candidates for clipping (e.g. which met conditions 1 and 2) using weighting factors of A=0.25 and C=0.50.
4. To the horizontally smoothed video signal above, vertical smoothing is applied to all pixels which were candidates for clipping (e.g. which met conditions 1 and 2)—either horizontally or vertically, using weighting factors of A=0.25 and C=0.50.

Steps 3 and 4 are optional, and are applied when visual examination indicates the need for smoothing.

The clipping procedure described above is currently applied in post production to the already enhanced image. Since image enhancement is usually applied in the video camera, or in the film scanner when the original image was on film, an appropriate location for applying image clipping would be in the video camera, and in the film scanner.

When the unenhanced video signal is available, as is the case for video cameras and film scanners, the process of generating the detail signal also identifies its location on the scan line as well as the upper and lower signal level bounds, since these bounds are the signal level of the unenhanced video at or near those points. With bounds already determined, it is a simple matter to clip the enhanced video signal to the level of these bounds.

Many television receivers also apply a "sharpness control" to further apply image enhancement. Signal clipping in the television receiver, with a modest offset to preserve small spikes, would greatly improve image quality of receivers whose sharpness control is (often) over-adjusted.

Implementation of the Enhancement Correction Process

The following describes a detailed implementation of the enhancement correction process when the subject region has been previously determined in some way, such as by computing a matte signal from a picture of a subject in front of a uniform color backing, (e.g. a blue-screen).

FIG. 7 is a top level flow chart for edge enhancement correction.

Referring to FIG. 7, edge enhancement correction can proceed by first initializing (see block 1) a marker array, which stores a value for each pixel position x, by resetting this value to zero for each pixel position x.

Next, this marker array is updated by performing a "multiple zero-crossings" check (block 2), marking (setting the marker array value to 1 for) each pixel which is at the center of a multiple zero-crossings neighborhood—i.e. marking each pixel which does not meet condition 2.

Next, the marker array is updated by performing a "distance from zero-matte boundary" check (block 3), marking (setting the marker array value to 1 for) each pixel which is not near a simple edge of the zero-matte (opaque subject) region—i.e. marking each pixel which does not meet condition 1.

Next the basic clipping operation (block 4) is performed on each pixel which has not been marked—i.e. for which the marker array value is still zero.

Next, a smoothing operation (block 5) is performed for each pixel which has not been marked—i.e. for which the marker array value is still zero.

The final output (of block 5) is the edge-enhancement corrected image.

Figure 8:
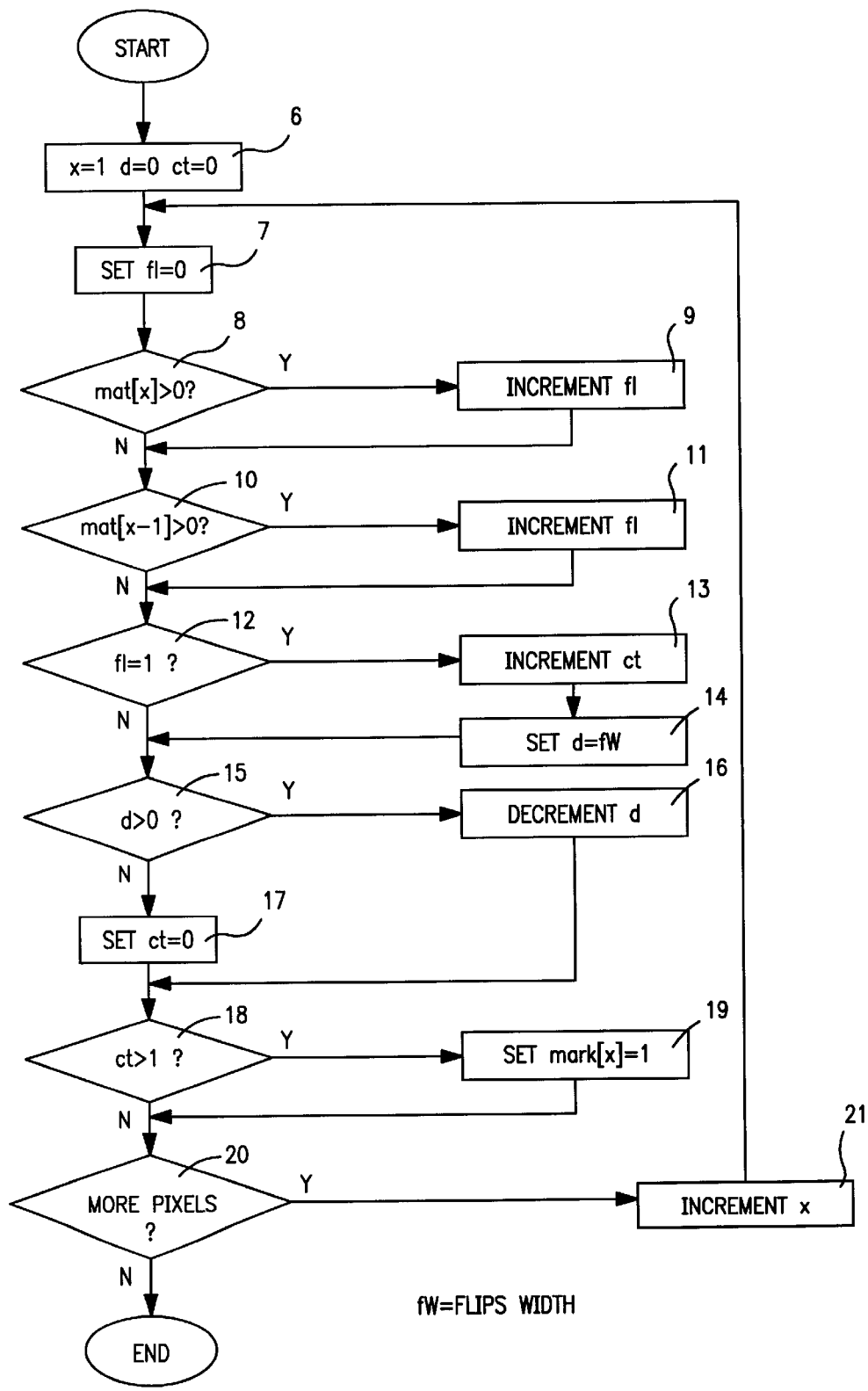
FIG. 8 details the process of performing the "multiple zero-crossings" check.

FIG. 8 details the process of performing the "multiple zero-crossings" check (block 2 in FIG. 7). The process illustrated in FIG. 8 is described as follows:

Initialize (block 6) some parameters: pixel position x to 1, a distance counter d to 0, and a zero-crossings counter ct to 0.

Next, reset a "condition counter" fl to 0 (block 7).

Next, check if the matte level at position x is positive (block 8). If it is, increment (add 1 to) the "condition counter" fl (block 9).

Next, check if the matte level at position x−1 is positive (block 10). If it is, increment the "condition counter" fl (block 11).

Next, check if the condition counter fl is equal to 1 (block 12). If it is, increment the "zero-crossings" counter ct (block 13), and set the distance counter d to fW (fW=2*gap+1, where gap is described earlier in the discussion ), a user supplied constant (see block 14).

Next, check if the distance counter d is positive (block 15). If it is, decrement (subtract 1 from) this distance counter (block 16). Otherwise (if it is not positive), reset the zero-crossings counter ct to zero (block 17).

Next, check if the zero-crossings counter is greater than 1 (block 18). If it is, mark pixel position x by setting the mark array to 1 at position x (block 19).

Next, check if there are any more pixels to process (block 20). If there are, increment pixel position x (block 21), go back to block 7, and repeat the process from that point.

Figure 9:
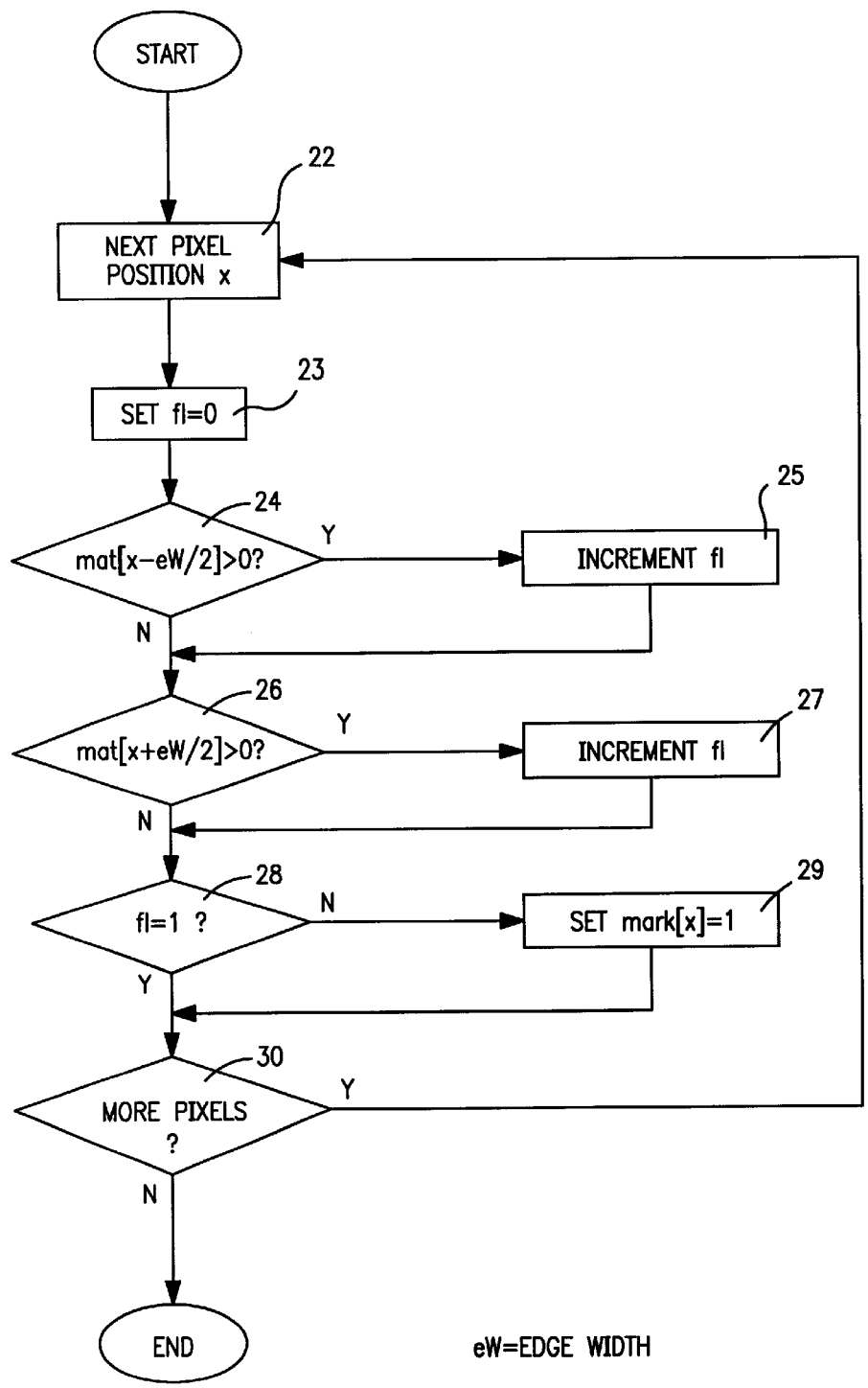
FIG. 9 details the process of performing the "distance from zero-matte boundary" check.

FIG. 9 details the process of performing the "distance from zero-matte boundary" check (block 3 in FIG. 7). The process illustrated in FIG. 9 is described as follows:

Take the next pixel position—i.e. update pixel position parameter x (block 22): To clarify, if this is the first visit to this block, set x to zero. Otherwise, increment x.

Next, set "condition counter" fl to zero (block 23).

Next, check if the matte level at pixel position x−eW/2 is positive (block 24). eW, or "edgewidth", is a user supplied constant (eW=2*el, where el is referenced earlier in the discussion). If it is positive, increment the condition counter fl (block 25).

Next, check if the matte level at pixel position x+eW/2 is positive (block 26). If it is, increment fl (block 27).

Next, check if the condition counter fl is equal to 1 (block 28). If it is not equal to 1, mark pixel position x by setting the mark array to 1 at position x (block 29).

Next, check if there are any more pixels to process (block 30). If there are, go back to block 22, incrementing pixel position x, and repeat the process from that point.

We claim:

1. A method for eliminating the visible outline at a subject's edge in an enhanced composite video image by clipping RGB levels of said enhanced video image to upper and lower level bounds represented by the signal levels of a video signal prior to its enhancement, and where said clipping is limited to a subject's edge, and comprises the steps of:

a) generating matte signal Ec for each pixel, where Ec is zero in an opaque subject area, and greater than zero outside the opaque subject area, b) identifying subject's edges as those pixel positions x for which only one of the two pixels, one at x−el and the other at x+el, where el is a user defined integer, has a matte signal of zero, thus satisfying a first condition edge test, c) determining, for each subject edge, at pixel position x, that said subject edge is a simple edge, thus satisfying a second condition edge test, by counting the number of subject edges in its neighborhood, along a line of pixels within a window centered about x, whose width is 2gap+1 pixels, where gap is a user selectable number of pixels, and determining that this count does not exceed one, and d) clipping RGB levels of each said simple subject edge pixel meeting said first condition and said second condition, to the bounds determined by the RGB levels of two pixels, one at position x−s, and the other at position x+s, where x is the position of the subject edge pixel, and s is a predetermined pixel position offset from position x.

2. The method of claim 1 in which the constants used are: s=1, el=2, and gap=3.

3. The method of claim 1 in which the clipped signal is improved by clipping a second time using said first condition edge test and using s=1, and el=3.

* * * * *